Nov. 10, 1936.  C. H. NEHLS  2,060,337
LOCKING DEVICE
Filed June 8, 1934
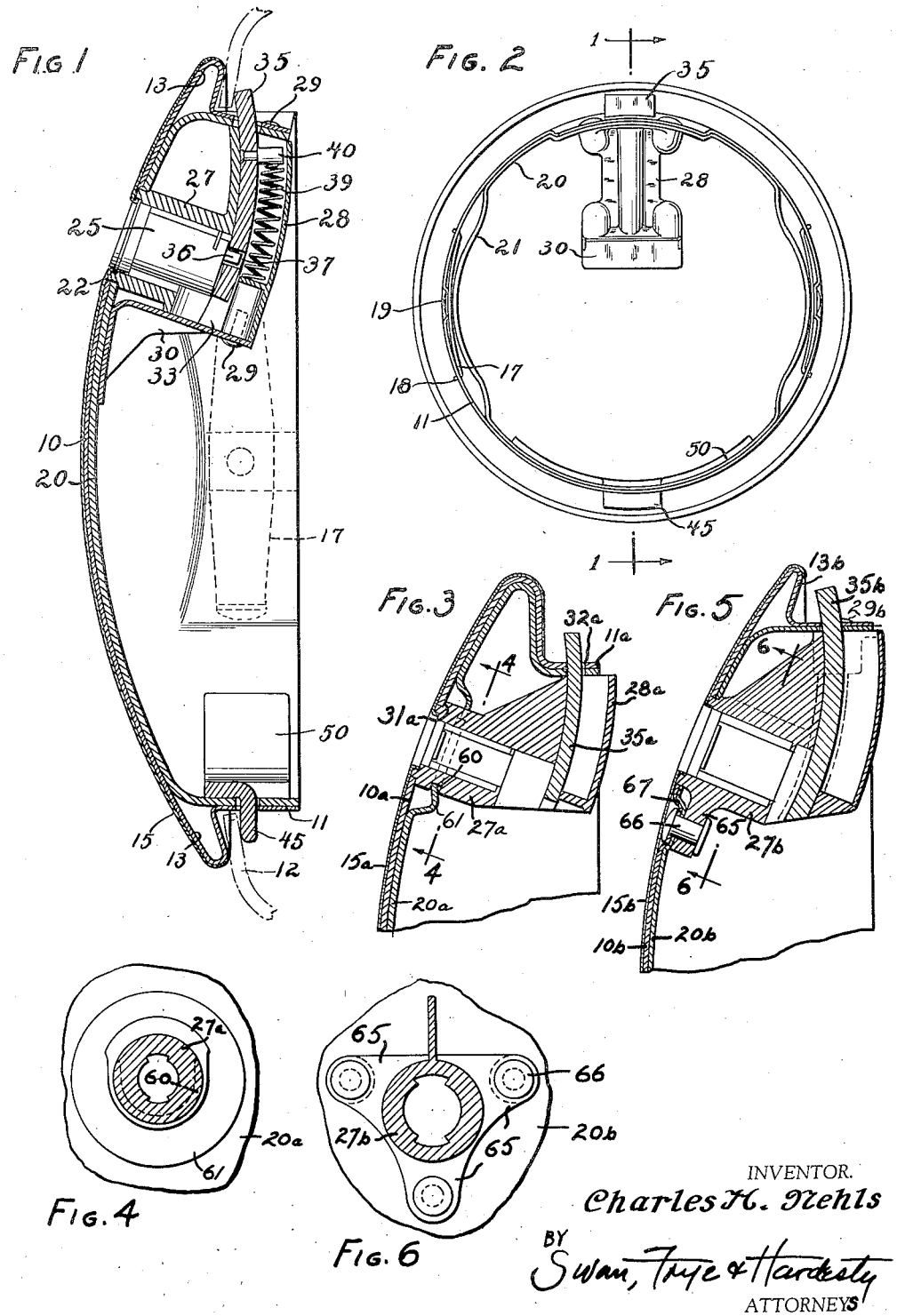
INVENTOR.
Charles H. Nehls
BY
Swan, Frye & Hardesty
ATTORNEYS Patented Nov. 10, 1936

2,060,337

UNITED STATES PATENT OFFICE 2,060,337

LOCKING DEVICE

Charles H. Nehls, Detroit, Mich., assignor to Eaton-Detroit Metal Company, Detroit, Mich., a corporation of Ohio Application June 8, 1934, Serial No. 729,647

3 Claims. (Cl. 70—90)

This invention relates to locking means, and is particularly directed although not necessarily limited to the provision of improved means for securing hub caps upon vehicle wheels in such manner as to prevent undesired removal of such caps, and of the wheels themselves, from either axles or other supports such as spare tire carriers and the like.

A particular object of the invention is the provision of improved and simplified means for maintaining hub caps and other closures firmly in place in such manner as to prevent rattling as well as guard against the insertion of jimmying or other forcing tools.

Another important object is the incorporation in such locking means of a novel curved lock bolt, projectable in a curved path in such manner as to urge the closure in a desired direction and clamp it in place as well as positively lock it against removal, and the construction of which is so simple that no additional apparatus whatever is required to accomplish said additional clamping and anti-rattling function.

Among further objects should be mentioned the provision of improved means for reenforcing and counter-balancing locking hub caps, and the improvement of friction retaining means for yieldably holding such caps in place independently of the locking means.

Improved means for securing locking means in such hub caps, and improved and simplified reenforcing means adapted to cooperate both in the strengthening of the cap and in the support of the locking means, constitute still other objects,—as do also improvement of the lock securing means and of the methods of construction of these parts, to the end of rendering identical locking means readily adaptable to caps of different dimensions, while simultaneously reducing costs of construction.

Other objects and advantages will be apparent from the following description, wherein reference is made to the accompanying drawing illustrating preferred embodiments of my invention, and wherein similar reference numerals designate similar parts throughout the several views.

In the drawing:

Figure 1 is a diametrical cross section of a hub cap incorporating certain elements of my invention and provided with a lock incorporating further principles thereof, indicating the method of attachment of the cap to the hub of a wheel and taken substantially on the line I—I of Figure 2;

Figure 2 is a plan view of the rear or inside of the cap of Figure 1;

Figures 3 and 5 are fragmentary sections similar to Figure 1 but showing modified lock mounting means as well as illustrating the adaptability of the lock to caps of variant dimensions; and Figures 4 and 6 are detail sections taken substantially on the lines 4—4 of Figure 3 and 6—6 of Figure 5 respectively and looking in the direction of the arrows.

Referring first to Figures 1 and 2 of the drawing, reference character 10 designates a sheet metal cap body, which is cupped to provide a substantially cylindrical marginal flange 11 adapted to enter the hub opening. A hub is indicated in dot-dash lines at 12 in Figure 1. Near its front outer edge the body portion is folded as at 13 to provide a rim flange serving as a stop limiting insertion of the cap in the hub opening in the well-known manner. The face of the cap may be covered by a finishing plate as 15 which may be given any desired finish and/or ornamentation, and secured in place by rolling its edge over the body flange 13 in the manner shown.

Secured to the inside wall of the cylindrical supporting flange 11 may be one or more leaf retaining or detent springs as 17 having rounded ends bent outwardly to project radially through and from slots (undesignated) in such flange. The rounded projecting ends of the spring members 17 are designated 18, and will be seen to be adapted to yieldably engage the inner edge of the cap opening in hub 12 to frictionally retain the cap in position independently of the locking means (presently to be described). The springs are shown as each having two active ends, and centrally secured to the sleeve as by rivets 19.

The cap is preferably interiorly reinforced by a heavier cupped sheet metal reinforcing element 20, which may be snugly fitted into the sleeve and generally conform to the contour of the inner face of the cap, to which it may be welded or otherwise suitable secured. The reinforcing element is preferably relieved over the detent springs 17, as at 21, thereby providing clearance permitting free flexing of the springs while nevertheless guarding this portion of the cap with equal effectiveness against forcing by a prying or jimmying tool.

In the face of the cap an aperture is formed as at 22 to expose the face of a lock cylinder 25 housed within the cap, thereby permitting manipulation of the cylinder from outside the cap by means of a key or the like (unshown). The locking portions are mounted in an integrally cast housing having a forwardly projecting portion 27 in which the lock cylinder 25 is rotatable and a laterally extending rear bolt housing portion 28, the housing assembly being shown in this view as secured in place inside the cap to support the lock and bolt by means of drive screws 29. The bolt casing section 28 is so fastened at its outer extremity to the sleeve portion 11, and at its other end to a bracket 30 projecting inwardly from the face of the cap.

As best shown in Figure 1, the bolt housing portion is provided with an arcuate channel 33 in which is reciprocable in a path generally radial with respect to the cap but curved in a plane transverse thereto, an arcuate lock bolt 35, which is connected to and adapted to be actuated by the lock cylinder in the usual or any desired manner, as by the cam lug 36 projecting from the rear face of the cylinder into an aperture as 37 in the bolt. A compression spring 39 may also be provided to urge the bolt toward projected position, being shown enclosed in the bolt housing section, and acting upon the bolt through an abutment 40 carried thereby. It will be seen upon inspecting Figure 1 that the lock bolt 35 is so curved and disposed that in moving toward projected position its outer end travels a curved path approaching the flange portion 13 of the cap, and so is driven against the rear of the hub portion 12, against which it is tightly held and still further urged by the spring 39, even when locked, due to the clearance provided by the aperture 37, which is formed larger than cam lug 36 to allow the spring such action. Thus the bolt and spring 39 tend to urge and hold the cap as far in the hub opening as possible, and the spring, by constantly urging the bolt against the back of the hub adjacent the opening, prevents rattling of the cap.

A cooperating retaining lug portion as 45 may project from the sleeve section 11 of the cap at a point substantially diametrically opposite the lock bolt, to fit behind the opposite portion of the hub bounding the cap opening. This lug is shown formed integrally with a counterbalance 50, which is preferably of such mass as to properly counterbalance the lock portions and associated elements. The counterbalance is shown as secured to the inside of the cap, as by welding or the like, while the integral lug 45 is turned outwardly through a slot (undesignated) in the sleeve section 11.

It is believed that the method of inserting and locking the cap will be obvious from the foregoing description, but emphasis is desired to be placed upon the fact that this novel locking means is readily adaptable, with or without modification, to the securing in place of closures of many and various sorts, its application to securance of a hub cap being intended to be regarded as illustrative merely.

In Figures 3 and 4 is shown a somewhat modified cap and lock assembly. In these views like reference numerals to those previously used have been applied to analogous parts, with the addition of the distinguishing character "a".

The cap is shown similarly formed of three main elements, a body 10a, a sheathing or finishing sheet 15a, and an inner reenforcing element 20a. The cylindrical lock housing portion 27a is shown as provided near its front extremity with a partly annular slot 60 extending around only that portion of the portion 27a which does not lie beneath the overhanging section of the bolt housing portion 28a. That is to say, the portion uppermost in Figures 3 and 4, and which is virtually inaccessible when the lock is in place within the cap is left unslotted, the slot extending only about 270° and tapering off in substantially parallel ends, as will be apparent from the drawing. The front end of the cylindrical portion 27a is also provided with a rabbet, 31a, which seats against an opening (undesignated) in the body 10a, through which the reduced front end of the cylinder housing section projects, although it is preferably covered by the sheathing 15a, as shown in the drawing.

The reenforcing member 20a is punched in alignment with the opening in the body to permit free passage of the front end of the cylindrical portion 27a therethrough, and is simultaneously struck up to form a boss 61 surrounding the opening through which the housing portion 27a extends and having inturned edges in alignment with the slot 60. After the lock has been positioned as shown in the drawing, these inturned edges of the boss so aligned with the slot are rolled into the slot to firmly secure the lock in place. Such rolling of the edges tightly against the slotted portion of the lock casing forces the upper, unslotted side of the casing against the adjacent portion of the flange carried by the boss.

In forming the apertured securing boss 61, which is preferably accomplished in a single punch press operation, the plane of the boss is preferably perpendicular to a radius of the path of movement of the curved lock bolt 35a, while the axis of the central aperture in the boss preferably coincides with such radius. It will be seen, therefore, that the apertured boss itself may be identical for caps varying somewhat in curvature and dimensions, and may be formed in different positions upon caps so varying, to allow the end of the bolt housing section 28a to properly abut the flange portion 11a, and the lock bolt to properly project therethrough. Thus in installing the lock in caps of variant proportions, the angular position of the lock housing may vary somewhat, and the aperture 32a may also be differently located, while the back end of the casing 28a may either project more or less from or lie within the cap. Differences in the angular position of the lock bolt, and in the point at which it projects through the flange caused by differences of cap proportions are rendered immaterial by the lock construction and method of mounting the same, for they are compensated for by the curvature of the bolt, which insures its projection into firm engagement with the back of the supporting hub, regardless of such variances.

In Figures 5 and 6 a cap is shown of somewhat different proportions, provided with another modified lock supporting assembly. Like portions of this embodiment are also designated by reference numerals similar to those previously used, but distinguished by the addition of the character "b".

Projecting radially from and near the front end of the substantially cylindrical lock casing portion 27b are a plurality of integral supporting lugs 65 apertured for the passage therethrough of suitable holding means, such as the rivets 66. The lug portions 65 are seated against, and the entire lock casing accordingly positioned by apertured bosses, as 67, internally struck up from both the body 10b and the reinforcing member 20b in the construction shown, although obviously they might be formed only in the reenforcing element. Such supporting bosses may be formed and punched simultaneously with the larger central aperture (undesignated) into which the front end of the cylinder housing 27b projects, and it will be seen that the bosses may in this fashion be accurately located with respect to each other and in a desired plane, and that the apertures are also thereby properly positioned. Moreover the same lock housing may be accommodated to caps of different proportions and dimensions by merely stamping them all in the same manner on the boss and aperture forming press, which is applied to the work in the most suitable position in accordance with the proportions of the cap, similarly to the positioning of boss 61 in the embodiment last above described. It has been found that even though a cap be relatively deeply cupped, the inner reinforcing member, as 20b, may, by virtue of this construction be formed in a single draw, and any minor inaccuracies thereof which result from such method of formation thereof do not interfere with accurate positioning of the lock casing, because the lock supporting bosses and apertures are accurately formed with relation to each other in a separate but single operation, as indicated. This operation, although it forms all three bosses and the mounting holes, may be much more accurate than the formation of the reinforcing member itself, as will be readily understood, and as stated above, the location and angular arrangement of these portions as a unit may be varied with respect to caps worked upon, conformably to any variances in the dimensions thereof. Such changes, for reasons also previously indicated, do not interfere with the effectiveness of the lock, since considerable latitude is afforded by the curvature of the bolt, which by reason of its curvature corrects for differences in its angular positioning, in the distance between the bolt and flange 13b, and the like.

While it will be apparent that the illustrated embodiments of my invention herein disclosed are well calculated to adequately fulfill the objects and advantages primarily set forth, it is to be understood that the invention is subject to variation, modification and change within the spirit and scope of the subjoined claims.

What I claim is:—

1. In a locking cap having a substantially flat and circular flange portion and a cylindrical flange portion of lesser diameter projecting therefrom, locking means including a bolt slidable through the cylindrical flange portion and having an end portion movable during such sliding movement adjacent the circular flange portion, said bolt being curved out of the general plane of said flat flange portion, whereby said end portion is movable laterally toward and away from said flat flange portion during sliding movement of the bolt.

2. The combination with a closure member having a face portion disposed in a predetermined plane, of a locking device for said closure member comprising a curved bolt, a housing secured to said closure member for supporting said bolt thereon with said bolt curvature in a plane transverse to the plane of said face portion and with a concave side of said bolt adjacent said face portion, and means for retracting and projecting said bolt, whereby an end thereof is caused to travel laterally with respect to said face portion.

3. In combination, a locking cap having a flange disposed to engage one face of a cooperating support along a predetermined plane, a curved bolt disposed to engage an opposite face of said support, and means comprising a housing secured to said cap for supporting said bolt on said cap with said bolt curvature in a plane transverse to the said plane of engagement and with the concave side of said bolt adjacent said flange.

CHARLES H. NEHLS.